United States Patent
Beaver, III et al.

(10) Patent No.: US 12,456,138 B2
(45) Date of Patent: Oct. 28, 2025

(54) METHOD AND COMPUTER READABLE STORAGE MEDIA FOR ROLE-BASED AND ATTRIBUTION-TRACKING COLLABORATIVE DESIGN OF CUSTOM PRODUCTS BASED ON MANUFACTURING CONSTRAINTS

(71) Applicant: ZAZZLE INC., Redwood City, CA (US)

(72) Inventors: Robert I. Beaver, III, San Francisco, CA (US); Jeffrey J. Beaver, San Francisco, CA (US); Sean Narvasa, Oakland, CA (US); Leslie Young Harvill, Olympia, WA (US); Petar S. Ivanov, Redwood City, CA (US); Parker H. Bossier, New York, NY (US); Christopher Collette, Los Altos, CA (US)

(73) Assignee: ZAZZLE INC., Menlo Park, CA (US)

( * ) Notice: Subject to any disclaimer, the term of this patent is extended or adjusted under 35 U.S.C. 154(b) by 656 days.

(21) Appl. No.: 17/038,659

(22) Filed: Sep. 30, 2020

(65) Prior Publication Data

US 2021/0118031 A1    Apr. 22, 2021

Related U.S. Application Data

(60) Provisional application No. 62/924,275, filed on Oct. 22, 2019.

(51) Int. Cl.
*G06Q 30/00* (2023.01)
*G06Q 30/0601* (2023.01)
*G06Q 10/101* (2023.01)

(52) U.S. Cl.
CPC ..... *G06Q 30/0621* (2013.01); *G06Q 30/0643* (2013.01); *G06Q 10/101* (2013.01)

(58) Field of Classification Search
USPC ........................................... 705/26.5
See application file for complete search history.

(56) References Cited

U.S. PATENT DOCUMENTS

2010/0257457 A1    10/2010    De Goes
2010/0299616 A1*   11/2010    Chen ................ G06Q 30/0601
                                                      715/753

(Continued)

FOREIGN PATENT DOCUMENTS

CN    103827923 A    5/2014
CN    106599040 A    4/2017

(Continued)

OTHER PUBLICATIONS

H. Xie, Tracking of design changes for collaborative product development, 2001, Proceedings of the Sixth International Conference on Computer Supported Cooperative Work in Design (IEEE Cat. No. 01EX472), London, ON, Canada, pp. 175-180. (Year: 2001).*

(Continued)

*Primary Examiner* — Kelly S. Campen
*Assistant Examiner* — Brittany E Bargeon
(74) *Attorney, Agent, or Firm* — Patterson & Sheridan LLP.; Malgorzata A. Kulczycka

(57) ABSTRACT

In some embodiments, a computer-implemented method for role-based and attribution-tracking collaborative design based on manufacturing constraints is disclosed. A method comprises: receiving product description data for an interactive design; wherein the product description data for the interactive design comprises data for generating a graphical visual representation of a physical product that is capable of custom manufacture with a plurality of variable product attributes; parsing the product description data to identify a plurality of global-key-values pairs journaled within the product description data and associated with contributors;

(Continued)

based on, at least in part, the plurality of global-key-values pairs, constructing an ownership-attribution tree; based on the ownership-attribution tree, generating manufacturing instructions for customizing the physical product and according to the plurality of variable product attributes; and transmitting the manufacturing instructions to a product customization server to cause a manufacturing entity to proceed with generating a customized product based on the manufacturing instructions.

20 Claims, 9 Drawing Sheets

(56) References Cited

U.S. PATENT DOCUMENTS

| | | |
|---|---|---|
| 2011/0016086 A1 | 1/2011 | Bakir |
| 2012/0221136 A1* | 8/2012 | Yucel .................... G06F 30/17 700/103 |
| 2013/0060801 A1* | 3/2013 | Beaver, III ......... H04N 1/00161 707/758 |
| 2013/0173714 A1* | 7/2013 | D'Amore ............. G06Q 10/101 709/205 |
| 2013/0193204 A1 | 8/2013 | Kerscher |
| 2015/0016661 A1* | 1/2015 | Lord ................ H04N 21/42203 382/100 |
| 2015/0019445 A1 | 1/2015 | Glass |
| 2015/0227939 A1 | 8/2015 | Huang |
| 2015/0324490 A1* | 11/2015 | Page .................. G06Q 30/0621 700/98 |
| 2017/0126785 A1 | 5/2017 | Esposito, II et al. |
| 2017/0199645 A1 | 7/2017 | Troy et al. |
| 2017/0346807 A1* | 11/2017 | Blasi ................... H04L 63/0807 |
| 2018/0115603 A1 | 4/2018 | Hu et al. |
| 2018/0183892 A1* | 6/2018 | Al Sabawi .......... H04L 67/1095 |
| 2018/0307794 A1* | 10/2018 | Bowman ................ G06T 19/20 |
| 2018/0375942 A1 | 12/2018 | Liu et al. |
| 2019/0108292 A1* | 4/2019 | Bowen ................. G06F 40/186 |
| 2020/0201294 A1* | 6/2020 | Nelson ................. G06F 21/602 |
| 2020/0257775 A1* | 8/2020 | Wright ................. G06F 16/152 |
| 2021/0118031 A1 | 4/2021 | Beaver, III et al. |
| 2021/0125192 A1 | 4/2021 | Beaver |
| 2021/0192097 A1 | 6/2021 | Beaver |
| 2022/0318874 A1 | 10/2022 | Beaver, III et al. |

FOREIGN PATENT DOCUMENTS

| | | |
|---|---|---|
| WO | WO 2013/033643 A1 | 3/2013 |
| WO | 2013180990 A2 | 12/2013 |
| WO | WO 2016/054651 | 4/2016 |

OTHER PUBLICATIONS

The International Searching Authority, "Search Report" in Application No. PCT/US2022/39571, dated Nov. 4, 2022, 11 pages.
The International Searching Authority, "Search Report" in application No. PCT/US2020/053585, dated Dec. 15, 2020, 13 pages.
Current Claims in application No. PCT/US2020/053585, dated Dec. 2020, 5 pages.
The International Searching Authority, "Search Report" in Application No. PCT/US2022/013436, dated Apr. 13, 2022, 11 pages.
Final Office Action dated Jun. 16, 2023 for U.S. Appl. No. 17/143,955.
Office Action dated Aug. 17, 2023 for U.S. Appl. No. 17/143,955.
US Office Action dated Aug. 18, 2023 for U.S. Appl. No. 17/193,512.
CA Office Action dated Feb. 13, 2024 for CA 3,150,117.
Final Office Action dtd Feb. 14, 2024 for U.S. Appl. No. 17/193,512.
CN Office Action dated Mar. 26, 25 for Application No. 202080065759.1.
Notice of Allowance for U.S. Appl. No. 17/143,955, dated Dec. 4, 2024.
Office Action dated Mar. 10, 2023 for U.S. Appl. No. 17/143,955.
Notice of Allowance for U.S. Appl. No. 17/193,512, dated Apr. 30, 2024.
Notice of Allowance dtd Sep. 12, 2024 for U.S. Appl. No. 17/143,955.
US Office Action dated Aug. 17, 2023 for U.S. Appl. No. 17/193,512.
Notice of Allowance dtd Apr. 30, 2024 for U.S. Appl. No. 17/193,512.
Final Office Action dated Jul. 6, 2023 for U.S. Appl. No. 17/240,074.
The International Searching Authority, "Search Report" in application No. PCT/US2022/020240, dated Jun. 22, 2022, 13 pages.
Notice of Allowance dtd Sep. 12, 2024 for U.S. Appl. No. 14/143,955.

* cited by examiner

METHOD AND COMPUTER READABLE STORAGE MEDIA FOR ROLE-BASED AND ATTRIBUTION-TRACKING COLLABORATIVE DESIGN OF CUSTOM PRODUCTS BASED ON MANUFACTURING CONSTRAINTS

BENEFIT CLAIM; CROSS REFERENCE TO RELATED APPLICATIONS

This application claims the benefit under 35 U.S.C. § 119 of provisional application 62/924,275, filed Oct. 22, 2019, the entire contents of which are hereby incorporated by reference for all purposes as if fully set forth herein.

This application is related to U.S. Pat. No. 8,090,461, granted Jan. 3; 2012, U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US patent application no. 2013/0060654, filed Aug. 29, 2012; the entire contents of each of which are hereby incorporated by reference for all purposes as if fully set forth herein.

FIELD OF THE DISCLOSURE

One technical field of the disclosure is attribution tracking as applied to multi-user computer-aided visual design of physical products that are capable of customization before manufacture. Another technical field is synchronization, coordination and ownership persistence tracking of concurrently received collaborative input to systems supporting multi-user computer-aided visual design of physical products that are capable of customization before manufacture. Yet another technical field is the validation of data input to systems supporting multi-user computer-aided visual design of physical products that are capable of customization before manufacture, including enforcing manufacturing constraints.

BACKGROUND

Over the years, computer-implemented collaboration applications have become more or more prevalent. Early examples of computer-implemented collaboration applications include tools that offer collaborative text editing, text messaging, and shared-calendar planning. Other collaboration applications offer shared spreadsheets, video conferencing, and picture sharing applications.

The recent innovations in information technologies and manufacturing have stimulated the development of collaboration applications. For example, due to many recent technological advances, many physical products may be customized online by providing interactive user input to an ordering system before the products are ordered from manufacturers and made. Customization of a product may include receiving digital user input defining attributes for the product and using the attributes to, for example, customize the appearance of the product. However, navigating through countless sets of attributes and dealing with, for example, countless clicks to complete the customization may be very difficult and cumbersome.

As a result, in many cases, rather than dealing with the complexities of the product-customization, computer users tend to skip over customization opportunities and order products as they appear in their default configurations.

SUMMARY

The appended claims may serve as a summary of the disclosure.

DETAILED DESCRIPTION

Figure 1:
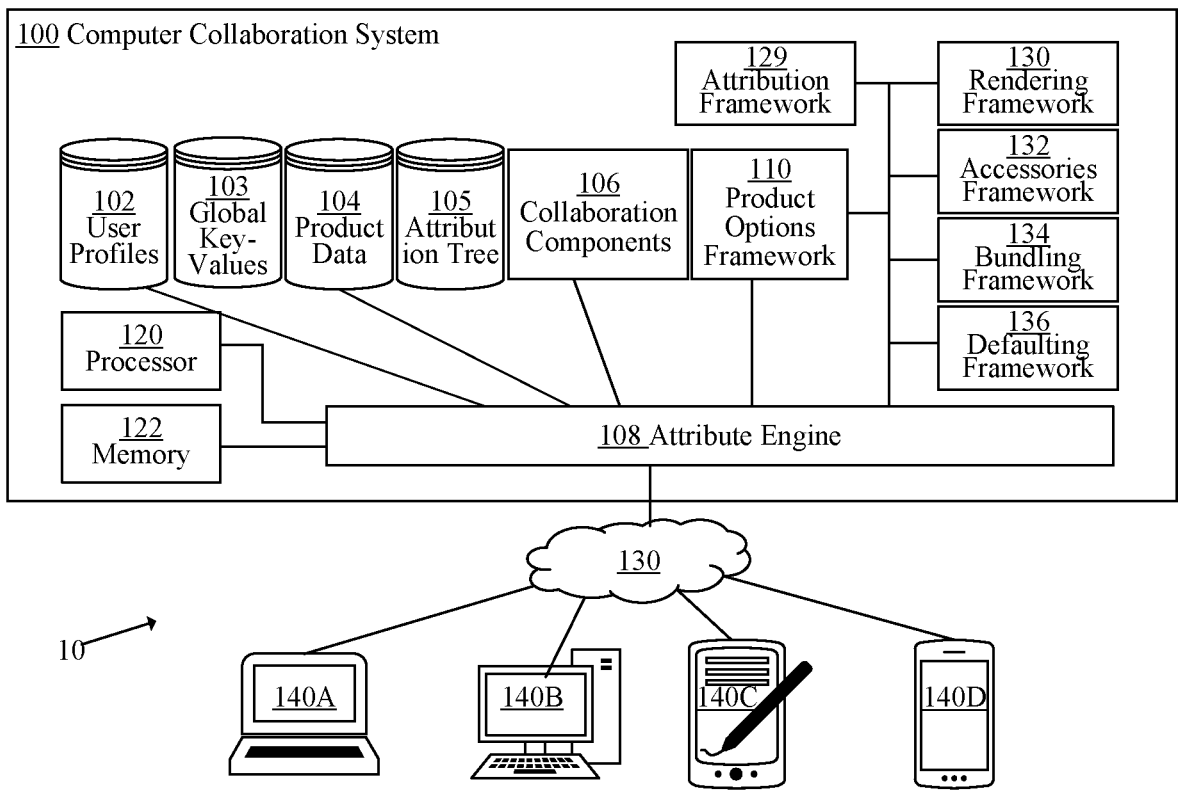
FIG. 1 is a block diagram showing an example computer system for providing a role-based collaborative platform.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. ROLE-BASED COLLABORATION PLATFORMS
   2.1. USER ROLES
   2.2. COLLABORATION DATA
      2.2.1. USER PROFILES
      2.2.2. PRODUCT DEFINITIONS
      2.2.3. ATTRIBUTE REPRESENTATIONS
      2.2.4. GLOBAL-KEY-VALUES
         2.2.4.1. CONSTRAINTS
         2.2.4.2. TRANSACTIONS
      2.2.5. ATTRIBUTION TREES
      2.2.6. COLLABORATION COMPONENTS
         2.2.6.1. USER INTERFACE ELEMENTS
         2.2.6.2. USER INTERFACE ELEMENTS FOR DESIGN AREAS
         2.2.6.3. CUSTOMIZED PRODUCTS
         2.2.6.4. PRODUCTS DURING A CUSTOMIZATION PHASE
         2.2.6.5. REPRESENTATIONS OF PRODUCT VIEWS
   2.3. PRODUCT OPTIONS FRAMEWORK
   2.4. ATTRIBUTE ENGINES
   2.5. USER DEVICES

3. ATTRIBUTION TRACKING
   3.1. INITIALIZATION
   3.2. INVITING OTHERS TO COLLABORATE
   3.3. UPDATING GLOBAL-KEY-VALUES
   3.4. TRANSMITTING MODIFICATIONS TO A FRAMEWORK
   3.5. STORING GLOBAL-KEY-VALUES
4. EXAMPLE GRAPHICAL USER INTERFACES
   4.1. COLLABORATION REQUEST SELECTORS
   4.2. EXAMPLE COMPONENTS OF A GUI
   4.3. GUI FUNCTIONALITIES
   4.4. CREATING AND MODIFYING INTERACTIVE DESIGNS
5. COLLABORATION EXAMPLES
   5.1. CUSTOMER-AGENT COLLABORATION
   5.2. CUSTOMER-PEER COLLABORATION
   5.3. EDUCATIONAL AND MANAGEMENT COLLABORATION
   5.4. COLLABORATION USING SERIALIZED STREAMS
   5.5. PUBLISHING
   5.6. PLAYBACK COLLABORATION
   5.7. JOURNALED LIST COLLABORATION
   5.8. TAGGING
6. MANUFACTURE OF CUSTOM DIGITAL PRODUCTS
7. DIGITAL PRODUCTS AS TOKENS OF PHYSICAL PRODUCTS
8. DIGITAL PRODUCTS AS TOKENS TO OBTAIN PHYSICAL PRODUCTS
9. IMPROVEMENTS PROVIDED BY CERTAIN EMBODIMENTS
10. IMPLEMENTATION MECHANISMS

1. General Overview

In some embodiments, a computer-implemented data processing method, computer system or computer program execute for facilitating and automating collaboration between computer users in customizing interactive designs of products. In an embodiment, a method for collaborative customization of physical product and for tracking collaboration attribution during the customization comprises receiving, at a computer collaboration server, product description data for an interactive design. The product description data for interactive design may include data for generating a graphical visual representation of a physical product that is capable of custom manufacture with a plurality of variable product attributes.

The product description data may be parsed by the collaboration server to identify a plurality of global-key-values pairs journaled within the product description data for a plurality of contributors. A global-key-values pair usually includes a key and a value associated with the key. The global-key-values pair is referred to as global because it is global to a current collaboration session. While the key has a persistent meaning across all transactions, the value is scoped to a specific collaboration session. Based on, at least in part, the plurality of global-key-values pairs, an ownership-attribution tree is constructed. Based on, at least in part, the ownership-attribution tree, manufacturing instructions for customizing the physical product and according to the plurality of variable product attributes are generated. The manufacturing instructions may be transmitted to a product customization server to cause a manufacturing entity to proceed with generating a customized product based on the manufacturing instructions.

Examples of the global-key-values pairs may include: an age restriction key-value that includes an age restriction key and an age value; a content lock key-value that includes a content lock key and a content lock key value; a blacklist key-value that includes a blacklist key and a blacklist; a whitelist key-value that includes a whitelist key and a whitelist; an ownership key-value that includes an ownership key and a user universally unique identifier (user ID); a copyright key-value that includes a copyright key and a user ID; a license key-value that includes a license key and a universally unique identifier for a specific license agreement held between an owner or a primary designer and a computer collaboration server; a customer support key-value that includes a support key and a support agent contract identifier; and an attribution key-value that includes an attribution key and a universally unique identifier that references a set of software instructions for manufacturing to apply a marking on a product as may be directed by copyright or licensing agreements. Other global-key-values, such as key-values that are specific to an implementation or a line of products, may also be implemented.

In some embodiments, the product description data for the interactive design is generated as one or more modifications to the interactive design are received from one or more user interfaces and are used to update the interactive design.

The plurality of global-key-values pairs journaled within the product description data may be originated when a customization session for customizing the interactive design is initiated. The plurality of global-key-values pairs may be updated each time when a contributor, who has been granted a valid license and who participates in the customization session, provides modifications to the interactive design. The plurality of global-key-values pairs may carry license agreement information and restriction information specific to the customization session and the interactive design.

In some embodiments, upon detecting that no further modifications for the interactive design are provided, the plurality of global-key-values pairs journaled within the product description data is stored in a global-key-values database.

2. Role-Based Collaboration Platform

FIG. 1 is a block diagram showing an example computer collaboration system for providing a role-based and attribution-tracking collaborative platform. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, including an embodiment depicted in FIG. 1, a computer collaboration system 100 includes a user profiles database 102, a product data definitions database 104, a global-key-values database 103, an attribution trees database 105, collaboration components 106, a product options framework 110, an attribute engine 108, one or more processors 120, one or more memory units 122, and one or more frameworks 129-136. Computer collaboration system 100 may communicate directly or via one or more communications networks 130 with one or more user devices 140A 140B, 140C, 140D.

Computer collaboration system 100 shown in FIG. 1 is provided herein to illustrate clear examples and should not be considered as limiting in anyway. Other computer collaboration systems may include additional components such as computer servers, various input/output devices, and additional software and/or hardware components that are not depicted in FIG. 1. Other computer collaboration systems may be implemented in cloud-based systems, distributed computer networks, and the like. Other computer collaboration systems may include fewer components than example computer collaboration system 100 shown in FIG. 1.

2.1. User Roles

Various roles may be assigned to users who interact with computer collaboration system 100 via user devices 140A-140D. Examples of roles may include a customer role, a customer support agent role, a graphics designer role, a customer peer role, and a customer product artist role. Based on the assigned roles, the users may be granted access to a product description of an interactive design as editors, viewers, managers, and the like.

A customer role may be assigned to a user who is a customer and who wants to customize one or more interactive designs offered by platform 10. A customer may, for example, edit/modify attributes of an interactive object, view a rendering of the customized design, publish the customized design, request that another user (a designer or a customer support agent) modify the interactive design according to the users' description, request a list of modifications that the user proposed for the interactive design, and/or delete or revert some of the modifications included in the list.

A customer support agent role may be assigned to a user who may assist other users in customizing an interactive design. A customer support agent may, for example, help in modifying the interactive design, provide various views of the rendered design, publish the rendered design on behalf of the user, and the like.

A graphics designer role may be assigned to a user who may assist in defining attributes for an interactive design, defining default values for the attributes for the design, defining ranges of the values for the attributes for the design, and/or customizing the interactive design. For example, a graphics designer may define a set of attribute-default values pair and store the pairs in product data definitions 104. A graphics designer may also define a set of roles that may be assigned to the users and store the set of roles in user profiles 102.

A customer peer role may be assigned to a user who may view an interactive design customized by someone else. A customer peer may, for example, view the interactive design as a customer customizes the design and provide comments or feedback on the design to the customer. A customer peer may be granted access to a product description for the customized design, and in some embodiments, may modify the attributes associated with the design.

A customer product artist role may be assigned to a user who may provide tutorials and online help in customizing interactive designs. A customer product artist may define attributes for the designs, determine default values for the attributes, determine ranges of values for the attributes, determine the roles for the user who may be allowed to customize the interactive designs, and/or demonstrate how to use the customization functionalities. Details of user roles and interactions between the user are described later in reference to FIG. 2A.

2.2. Collaboration Data

Computer collaboration system 100 may include one or more databases 102-105 used to store information used to facilitate, conduct and save collaboration sessions. The types of the databases included in collaboration system 100 may vary and may depend on the implementation of platform 10. In the example depicted in FIG. 1, databases 102-105 include storage components configured to store, for example, attribution information, license information, restriction information, user profiles, global-key-values and other data used to track attributions of the contributors participating in customization sessions, as well as product definitions and other data used to generate a plurality of representations of customized products.

2.2.1. User Profiles

Computer collaboration system 100 may include one or more storage devices for storing user profiles database 102. User profiles database 102 may be used to store information indicating roles assigned to individual users, access codes or keys assigned to the users, identifiers and password assigned to the users, and the like. Examples of roles that may be assigned to the users were described above.

2.2.2. Product Definitions

Computer collaboration system 100 may further include one or more storage devices for storing product data definitions database 104. Product data definitions database 104 may include product descriptions of one or more interactive designs that are offered by computer collaboration system 100. A product description of an interactive design may include, for example, a global-key-values set, a set of attributes that are associated with the design, and default values that may be assigned to the attributes of the design.

2.2.3. Attribute Representations

Collaboration components 106 may include a component that is used to store a representation of attributes of an interactive design. The attributes may correspond to characteristics of the products and may be selected or provided by manufacturers of the products. The attributes may have assigned default values and the default values may be assigned either by the manufacturers, system administrators managing computer collaboration system 100 or platform 10, or artistic designers, as described earlier.

Descriptions of the attributes for each interactive design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of computer collaboration system 100, such as a product options framework 110, which is described later.

For each interactive design available for customization using platform 10, default values of the attributes associated with the product may be modified by users according to the roles assigned to the users and according to the manufacturing constraints provided by a manufacturer. For example, if a customized product is a t-shirt, its default color may be red, but a user may modify the color by selecting any of three colors (e.g., red, green, or blue) to the tee-shirt. The modification may be stored in, for example, product data definitions 104.

An interactive design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved or embroidered embellishments, and/or color palettes applied to the design.

Attribute definitions and types, as well as default values for the attributes of an interactive design, may be provided by a manufacturer or a designer of the design. The attributes and default values may be changed by the users according to, for example, the roles assigned to the users. For example, a user who is assigned a role of an artistic designer may be allowed to edit/modify the attributes associated with the design, edit the default values of the attributes, as well as edit the ranges of the values that may be assigned to the attributes.

Suppose that an interactive design is a mug. Then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a customer may modify the color of the mug by selecting either red or blue and may modify the size of the mug by selecting either large or small.

In some embodiments, a product description may include, or be associated with, a journaled list of modifications that have been submitted by users for an interactive design. The list may also include other information such as identifiers of the users who provided the modifications, global-key-values generated as the collaborators collaborated on the customized product, a history log of the modifications that have been accepted, reverted or deleted, comments that have been provided by the user, and the like. For example, one or more modifications stored in the list may be undone or redone by using a couple of clicks, not by preforming countless clicks to undo or redo the customization as in conventional customization platforms.

The journaled list may also include global-key-values described in the next section.

2.2.4. Global-Key-Values

Computer collaboration system 100 may include one or more storage devices for storing global-key-values database 103. Global-key-values database 103 may store global-key-values sets that are used to track the contribution of each collaborator in a collaboration session, and to impartially establish copyrights and ownership for the customized product developed during the collaboration session.

All global-key-values pairs created and modified during a particular collaboration session are global in scope of that particular collaboration session. While the key has a persistent meaning across all transactions, the value is scoped to a specific collaboration session. A global-key-value may correspond to a tuple, or a pair, that has a key and a value. The key may indicate an attribute identifier/key, while the value may indicate a specific value for the key. For example, a global-key-value for an attribute called "owner" may include an "owner" as a key and a specific "user identifier" as a value. Detail examples of global-key-values are described later.

For each customization project, at least one global-key-values set is generated. For example, when a customization project starts and a project owner initiates a collaboration customization session, collaboration system 100 may initiate global-key-values to indicate, for example, an identification of the owner, an identification of his license, and the like. Thus, the initial global-key-values set may include the following pairs: {Owner, user ID1}, {License, User ID1}. When the owner invites, for example, a designer to assist the owner with the customization, collaboration system 100 updates the set of global-key-values by adding an additional global-key-value pair to indicate, for example, an identification of the designer. Thus, the additional global-key-values pair may include: {Designer, user ID2}. When the owner decides to finish the collaboration customization session, collaboration system 100 may, for example, combine the relevant global-key-values pairs and initiate the processing of the pairs, as will be described later.

Examples of global-key-values may include constraints that specify rules and applicability of the rules to a product customization process, and transactions that specify entities and customization instructions for customizing the product. An example of a constrain global-key-value may include an age restriction constraint that prohibits individuals younger than 12 to customize the product. An example of a transaction global-key value may include a key-value pair that comprises customization instructions for a product customization. Details about the constrain global-key-values and transaction global-key-values are described later herein.

Figure 2A:
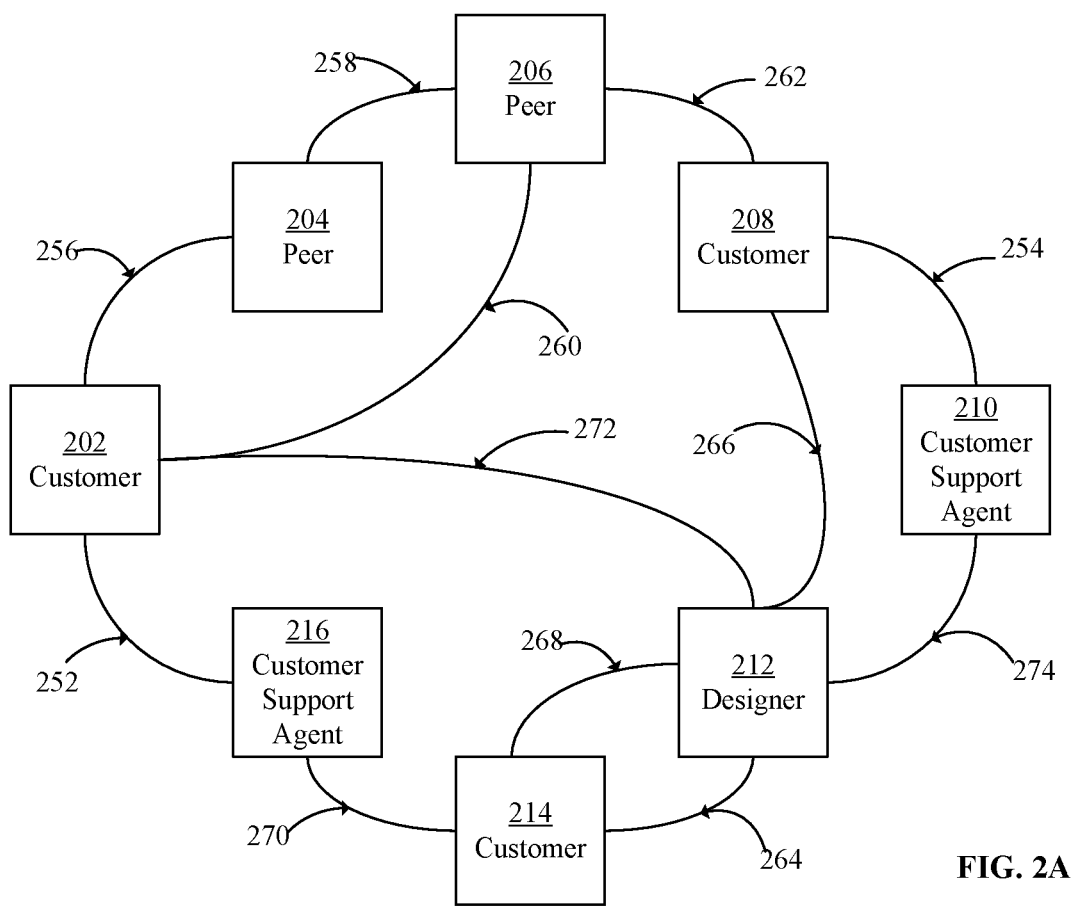
FIG. 2A is a block diagram showing collaboration examples.
Figure 2B:
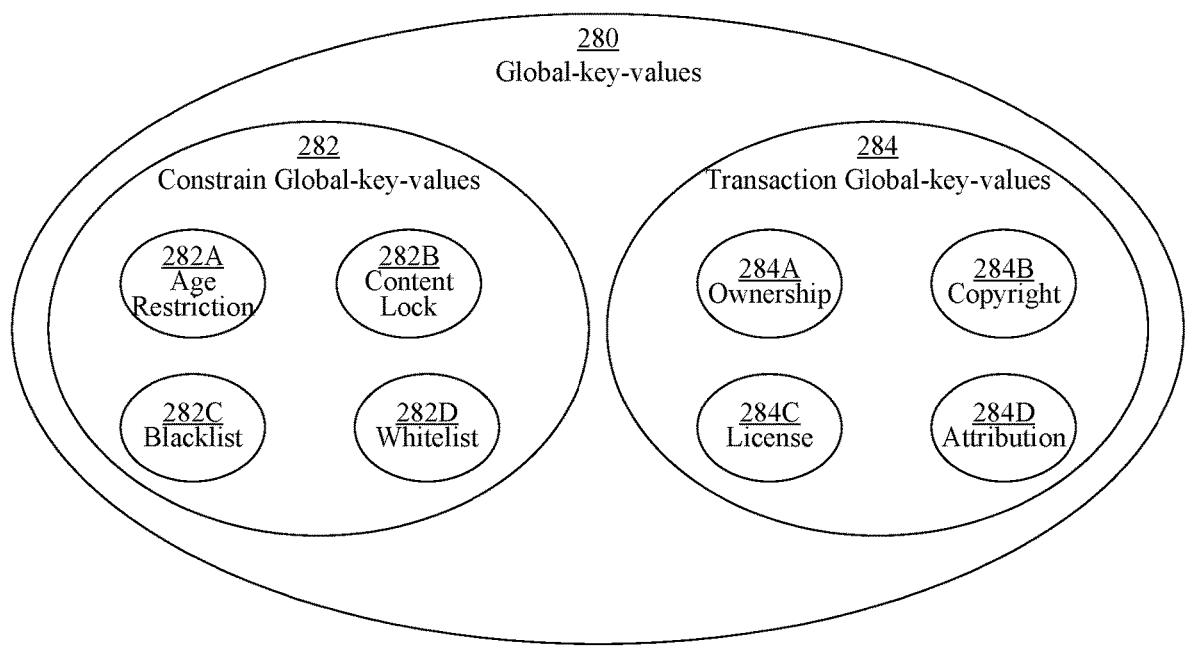
FIG. 2B is a block diagram showing examples of global-key-values.

FIG. 2B is a block diagram showing examples of global-key-values 280. In some embodiments, global-key-values 280 are used to specify certain rules that are to be applied to customized products and/or customization processes. In some embodiments, global-key-values 280 may be divided into two groups: constrains global-key-values 282 and transaction global-key-values 284. Constraint global-key-values 282 may be used to set forth constraints on the a customized product and/or a product customization process, while transaction global-key-values 284 may be used to capture the customization instructions set forth by the collaborators participating in a product customization process and used to derive manufacturing instructions for generating a customized product.

2.2.4.1. Constraints

In some embodiments, constrain global-key-values 282 may be specified by an owner, a designer, and the like, during a product customization session, and may be used to specify one or more constraints to be applied to a product customization process. The examples of constraint global-key-values 282 may include an age restriction constraint 282A which may be represented as a key-value pair {Age, 12}. Age restriction constraint 282A may, for example, indicate the minimum age of a customer who could purchase a custom product. Since certain products may be inappropriate for children, using a constrain global-key-value pair {Age, 12} may indicate that only customers who are at least 12 years old may purchase that product.

Another example of constraint global-key-value 282 is a content lock constraint 282B, which may specify that a key-value or set of key-values may not be modified. Content lock 282B may be a full lock, a partial lock, or a specific lock. For example, a user may specify that a first design is fully locked, while a second design is locked only if one attempts to modify a particular portion of the design (a partial lock or a specific lock).

Examples of constrain global-key-values 282 may also include a blacklist content restriction constrain 282C. This constrain may pertain to a list of content, such as imagery, text, color, or material composition. Blacklist constrain 282C may include a blacklist key "Blacklist," and one or more names, words, and the like, to form: {Blacklist, name1, word1, . . . }.

Additional examples of constrain global-key-values 282 may include a whitelist content restriction constrain 282D.

This constrain may pertain to a list of content, such as imagery, text, color, or material composition, that may be used to modify a key-value, or a set of key-values in the saved data of a product description, which is described later, or when a key value journal is applied to a custom product. Whitelist constrain 282D may include a whitelist key "Whitelist," and one or more names, words, and the like, to form: {Whitelist, name1, word1, . . . } Additional details of constrain global-key-values are described later herein.

2.2.4.2. Transactions

In some embodiments, transaction global-key-values 284 are used to capture the customization instructions set forth by collaborators participating in product customization sessions. The transaction global-key-values 284 may be used to derive manufacturing instructions for generating a customized product. Transaction global-key-values 284 are probably the most often key-values used in collaboration platform 10, and therefore, for the brevity of the description, they are often referred to just as global-key-values 284.

A global-key-values set may comprise one or more key-value pairs, and each key-value pair may include a key and a value. Each new pair is added as another contributor contributes to the customization project. Examples of key-value pairs include an ownership key-value pair 284A that includes an ownership key and a user universally unique identifier (user ID); a copyright key-value pair 284B that includes a copyright key and a user ID; a license key-value pair 284C that includes a license key and a universally unique identifier for a specific license agreement held between an owner or a primary designer and a computer collaboration server; a customer support key-value pair (not shown) that includes a support key and a support agent contract identifier; and an attribution key-value 284D that includes an attribution key and a universally unique identifier that references a set of software instructions for manufacturing to apply a marking on the product as may be directed by copyright or licensing agreements. Additional detail about the global-key-values are described later.

2.2.5. Attribution Trees

Referring again to FIG. 1, computer collaboration system 100 may further include one or more storage devices for storing an attribution tree database 105. Attribution tree database 105 may store ordered key-value pairs of global-key-values sets that are used to track contribution of each collaborator participating in a customization project. An attribution tree may be derived based on the global-key-value pairs generated during a collaboration project. It may be represented in a form of a tree structure, or any other structure, such as a table, and the like.

Figure 2C:
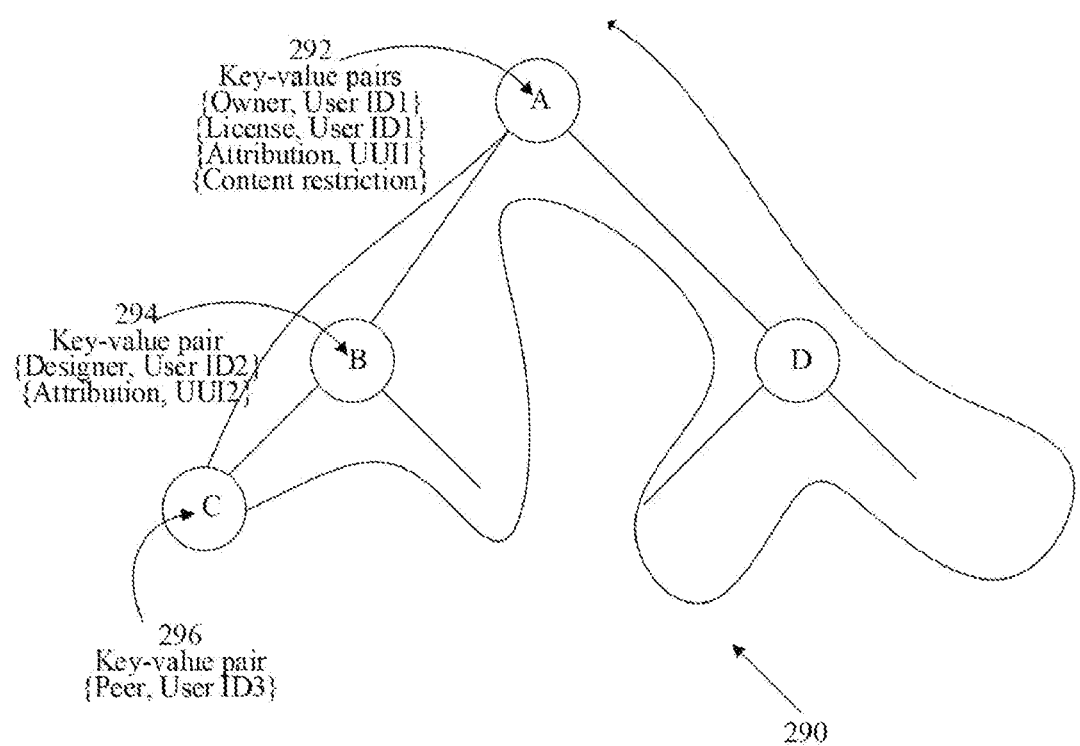
FIG. 2C is a block diagram showing an example attribution tree.

FIG. 2C is a block diagram showing an example attribution tree 290. Depicted attribution tree 290 is shown as a tree-based diagram; however, in other implementations, an attribution tree may be represented as a table, a mapping, or any other data structure configured to capture a sequence of global-key-values pairs generated during a product customization process.

In the depicted example, attribution tree 290 comprises four nodes: a node A, a node B, a node C and a node D. The node A is a starting node and it corresponds to an owner node. The node B is connected to the node A and to the node C and is a designer node. The node C is connected to the node B and is a peer node. The node D is connected to the node A. In other examples, an attribution tree may include fewer or more nodes and their special relationship to each other may differ from the one shown in FIG. 2C.

Suppose that a global-key-values set for a customization project initiated by an owner included three key-value pairs, such as {Owner, user ID1 }, {License, user ID1 }, {Attribution, UUI1}, and {Content restriction}. The corresponding global-set-values for the node A are depicted in FIG. 2C as 292.

Suppose that the owner invited a designer to collaborate on the customization project.

Hence, as the designer joined the customization project, another key-values set was added to the global-key-values set associated with the customization project. That key-values set of pairs may include {Designer, user ID2}, {Attribution, UUI2}. The corresponding global-set-values for the node B are depicted in FIG. 2C as 294.

Suppose that the designer invited a peer to collaborate on the customization project. Hence, as the peer joined the customization project, other key-values set was added to the global-key-values set associated with the customization project. That key-values pair may include {Peer, user ID3}. The corresponding global-set-values for the node C are depicted in FIG. 2C as 296.

Suppose that subsequently the customization project was finished. Thus, an example attribution tree, built from the global-key-values collected during the project may include the following pairs: for the node A: {Owner, user ID1}, {License, user ID}, {Attribution, UUI1}, {Content restriction}; for the node B: {Designer, user ID2}, {Attribution, UUI2}; and for the node C: {Peer, user ID3}.

The global-key-values set depicted in FIG. 2C may be used to track attributions of the collaborators participating in the customization session, and to generate manufacturing instructions for the customized product and licenses that are required to complete the project. The manufacturing instructions may be derived from UUI1 and UUI2, while the licenses may be derived from the {License, user ID1} pair. Additional details about attribution trees are described later herein.

2.2.6. Collaboration Components

Referring again to FIG. 1, computer collaboration system 100 may include one or more software applications configured to implement collaboration components 106. Collaboration components 106 may include modules that are used to implement a role-based collaboration between users. The types of the modules included in collaboration components 106 may vary and may depend on the implementation of platform 10. In the example depicted in FIG. 1, collaboration components 106 include components configured to generate a plurality of representations. The examples of the representations are not shown in FIG. 1, but they are, however, described below.

2.2.6.1. User Interface Elements

Collaboration components 106 may include a component that is used to store a representation of user interface elements (not shown) that users may use to collaborate with each other and to customize interactive designs.

A user may modify values of attributes defined for an interactive design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive design. Furthermore, the user may customize individual portions of the customizable product or groups of portions of the customizable product.

The type and selection of user interface elements to be provided to a user may depend on a role assigned to the user. For example, if a user is a customer, then the user may edit his own interactive design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive design itself. For example, if platform 10 offers customizable ties and customizable scarfs, and a user profile for a user includes information indicating that the user is a male, then it is assumed that the user might want to customize a tie, not a scarf. Furthermore, it may be assumed that the user would like to customize a color, a material and a shape of the tie. Based on that information, collaboration components 106 may select the user interface elements that are specific to the tie and to the selection of the tie attributes.

2.2.6.2. User Interface Elements for Design Areas

Collaboration components 106 may include a component that is used to store a representation of graphics user interface elements (not shown) associated with design areas of a customizable product. Design areas may include one or more areas defined within the customized product that a user may customize and/or modify. For example, if platform 10 offers customizable mugs, then design areas may include an area for showing an outside surface of the mug, an area for showing an inside surface of the mug, and an area for showing a surface of the mug handle. A product description for the design may specify that a user may modify the appearance of each of the surfaces separately, or that the user may group the surfaces and modify the group.

2.2.6.3. Customized Products

Collaboration components 106 may include a component that is used to store a representation of a finished customized product (not shown) as a fully rendered image. Rendering of the image may reflect the effect of sequentially applying all the modifications provided by users during a design collaboration. The representation of the finished customized product may include the rendering of the customized product as the product would appear after the customization process is completed.

2.2.6.4. Products During a Customization Phase

Collaboration components 106 may include a component that is used to store a representation of a product during a customization phase as a user customizes an interactive design. For example, if a user modifies the attributes associated with the design, the modifications may be translated into serialized customization actions and the corresponding serialized customization data may be stored in a journaled list of the modifications. The modifications may be used to render one or more representations of the design as the customization of the product progresses. The rendered representations may be displayed in a user interface generated for the user.

2.2.6.5. Representations of Product Views

Collaboration components 106 may include a component that is used to store one or more representations of one or more views of an interactive design as the design is updated by users. The views may also include specific views of the product attribute group or groups that are filtered according to a task that the user is performing and/or according to a role that is assigned to the user.

2.3. Product Options Framework

In some embodiments, product options framework 110 comprises a plurality of modules and applications which, when executed by one or more processors 120, cause the processors to implement the method for role-based and attribution-tracking collaborative design of custom products. Product options framework 110 may be configured to communicate with an attribution framework 129, a rendering framework 130, an accessories framework 132, a bundling framework 134, and a defaulting framework 136.

Attribution framework 129 may be configured to, for example, generate an attribution tree, as the tree shown in FIG. 2C, based on global-key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global-key-values collected during the session.

Product options framework 110 may be configured to receive inputs from rendering framework 130 to generate a rendering of an interactive design based on, at least in part, a current representation stored in collaboration components 106. Product options framework 110 may be also configured to receive inputs from accessories framework 132 to determine one or more accessories for an interactive design, and to include the determined accessories in the customization of the product.

Furthermore, product options framework 110 may be configured to receive inputs from building framework 134 to determine constraints for customizing an interactive design. This may include determining one or more attributes that are associated with the design and that can be customized by users. This may also include assigning default values to the determined attributes, determining ranges of values for the attributes, and/or determining sets of values that may be assigned to the attributes.

Product options framework 110 may be also configured to receive inputs from defaulting framework 116 to determine a default design for an interactive design, determine default roles that may be assigned to the user, and determine initial values for various parameters and attributed associated with the designs and collaboration sessions.

2.4. Attribute Engines

Attribute engine 108 may be configured to facilitate role-based collaboration of customizable product according to roles assigned to users and according to manufacturing constraints set forth for the products.

Attribute engine 108 may be configured to, for example, interact with collaboration components 106, product options framework 110, frameworks 130-136 and user devices 140A-140D to allow the users using devices 140A-140D to collaborate in customizing interactive designs offered by platform 10.

In some embodiments, attribute engine 108 may be configured to interact directly with users of user devices 140A-140D. In other embodiments, attribute engine 108 may be configured to interact with users of user devices 140A-140D via a computer network 130, as shown in FIG. 1.

Computer network 130 may be implemented as any type of communications network, including a local area network (LAN), wide area network (WAN), a wireless network, a secure virtual LAN (vLAN), a secure virtual WAN (vWAN), and the like.

2.5. User Devices

User devices 140A-140D may include any type of communications devices configured to facilitate communications between users of user devices 140A-140D and computer collaboration system 110. In the example depicted in FIG. 1, a user device 140A is a laptop, a user device 140B is a personal computer, a user device 140C is a personal assistant device, and a user device 140D is a mobile device such as a smartphone. The types and counts of user devices 140A-140D are not limited to the examples shown in FIG. 1. For example, even though FIG. 1 depicts only one laptop 140A, one personal computer 140B, one personal assistant 140C and one smartphone 140D, platform 10 may include a plurality of laptops 140A, a plurality of personal computers 140B, a plurality of personal assistants 140C and/or a plurality of smartphones 140D. In other examples, user devices may include fewer devices than those depicted in FIG. 1.

3. Attribution Tracking

In some embodiments, the role-based collaboration and attribution-tracking comprises tracking the ownership within a customization session, tracking the licensing agreements of collaborators participating in the customization session, tracking copyrights and access privileges with respect to the assets used and modified during the session, and tracking attributions of the collaborators participating in the session. Supporting the attribution-tracking and tracking the contribution of each collaborator allows establishing the rights and ownership of the customization and customized assets.

Figure 2D:
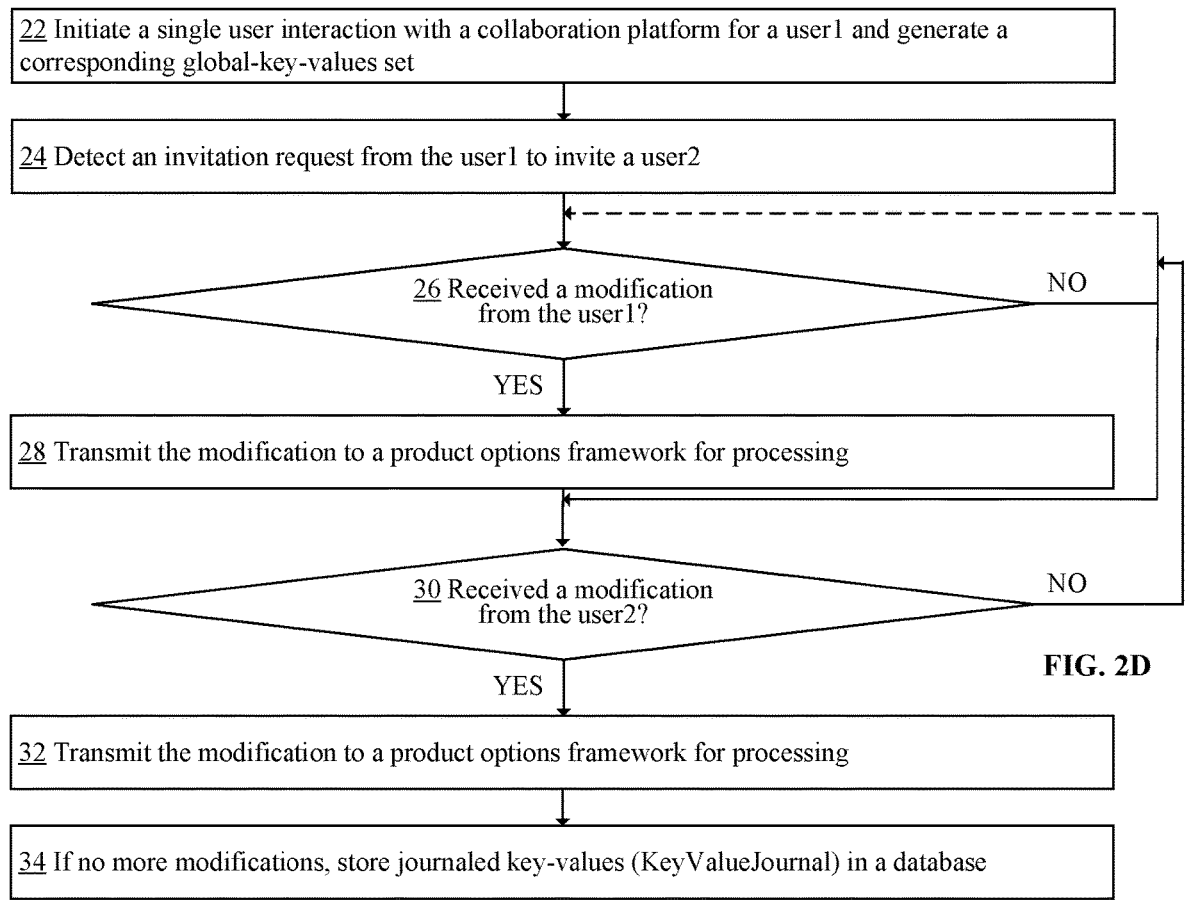
FIG. 2D is a flow diagram showing an example process implementing role-based collaboration and attribution-tracking.

In some embodiment, the attribution-tracking is facilitated by applying global-key-values associated with ownership and copyright keys to a, so called, journaled list of key-value pairs. As described later, a journaled list of key-value pairs is a list of global-key-values pairs collected during a customization session, and organized sequentially in a form of, for example, an attribution tree, such the tree shown in FIG. 2C. The journaled list of key-value pairs provides a means that can be used to track ownership. An example process illustrating the interactions during a customization session is depicted in FIG. 2D. However, it should be appreciated that other copyright or licensing agreements may be used than those described herein.

FIG. 2D is a flow diagram showing an example process implementing role-based collaboration and attribution-tracking.

3.1. Initialization

In step 22, a single user interaction with a collaboration platform is initiated by a user. The interaction with the collaboration platform is also referred to herein as a session. By initiating the session, the user may agree to assume the copyright and ownership for a work-product generated during the collaboration session. The user may also agree to allow the licensing of that copyright for the manufacture of a custom product later on generated based on the work-product. These agreements may be implicit or explicit, or both. The user may be referred herein as an owner or as a user1.

Subsequently to the agreements, a product description is initiated for the work-product, and then modified to include the user1's ownership key-value, copyright key-value, and the licensing key-value of the licensing agreement. For example, the following global-key-value set may be generated: {Owner, user ID1}, {Copyright, user ID1}, {License, user ID1}.

3.2. Inviting Others to Collaborate

In step 24, an invitation request from the user1, to invite a user2 to the collaboration session, is detected. The invitation request may be generated as the user1 selects a user interface element to invite the user2 to collaborate on the design. In response to the invitation request, an invitation is generated and sent to the user2. The invitation may have an encoded key that allows the user2 to join the interaction, i.e., the customization session. The user2 may be presented with an interface that allows the user2 to define and confirm the role that the user2 has been assigned. Suppose that the user2 is assigned a role of a viewer.

Subsequently to inviting the user2, the user2 is added to the product description for the work-product as a viewer.

Upon accepting the invitation, the user2 agrees to the license agreement of the user1 and agrees to contribute to the user1's work product and copyright.

3.3. Updating Global-Key-Values

Subsequently, the product description for the work-product is modified to include the user2's copyright key-value, and the licensing key-value of the user2's licensing agreement.

In step 26, a test is performed to determine whether the user1 selected, using the capabilities of the user1's UI, a location-based attribute group for a customized product, and if so, whether the user1 is making a modification to any of the attributes.

If a modification is detected, then step 28 is performed. Otherwise, the test is repeated in step 26 or a different test is performed in step 30.

In step 28, the modification is transmitted as serialized key-value pairs and associated binary data to a product options framework. An example of the product options framework is framework 110 described in FIG. 1.

Referring again to FIG. 2D, upon receiving the modification, the framework updates the product description for the customization session. Furthermore, the framework generates a journaled action of the user1, and tags it with the user1's ownership token.

Also, in this step, the product description updates the GUIs of all collaborators, i.e., the user1 and the user2.

Suppose that subsequently, the user1 selects a user interface element to change the for the user1 from a viewer to an editor to allow the user2 to edit the product description for the customization session. The information about the new role of the user2 is saved and tagged with the ownership of the user2.

Suppose that the user2 starts modifying attributes of the customized product. Suppose that the user2 chooses, using the capabilities of his GUI, a front design area attribute group for the customized product, and makes a modification to the attributes.

In step 30, a test is performed to determine whether the user2 selected, using the capabilities of the user2's UI, an attribute group for a customized product, and if so, whether the user2 is making a modification to any of the attributes.

If a modification is detected, then step 32 is performed. Otherwise, the test is repeated in step 26.

3.4. Transmitting Modifications to a Framework

In step 32, the modification is transmitted as serialized key-value pairs and associated binary data to a product options framework. The modification may be uploaded and represented as, for example, a JPEG image to be displayed as the work product of the user2. User2. The user1, however, is still responsible financially because the user1 has initiated the session.

Upon receiving the modification, the framework generates a journaled action of the user2, and tags it with the user1's ownership token. The JPEG image may be tagged with the user2's copyright information. The journaled action is tagged with the user2's license of their copyright for use in the work product of the collaboration with the user1. Thus, the user2 let the user1 to use the license. Embedded in the chain is the license of the user2 that the user2 signed when he started the collaboration and gave it to the user1. Then, the framework updates the product description for the customization session.

Also, in this step, the product description updates the GUIs of all collaborators, i.e., the user1 and the user2.

3.5. Storing Global-Key-Values

In step 34, which is performed when no more modifications are provided by either the user1 or the user2, and thus, which is performed at the end of the customization session, the modifications to the work product of the collaboration are stored as journaled key-values (KeyValueJournal) in, for example, global-key-values database 103, shown in FIG. 1. Furthermore, the collaboration session ends, and its work product and ownership are recorded.

In some embodiments, the journal itself has a universally unique identifier (UUI). Furthermore, the KeyValueJournal may be assigned a Universally Unique Identifier Code (UUID).

4. Example Graphical User Interfaces

In the context of role-based collaboration, a graphical user interface (GUI) may be designed to support collaboration between users on interactive designs. The GUI may be used to, for example, facilitate collaboration between customers, peers, customer support agents, designers and others by providing the functionalities that allow enhancing the product customization process. The organization and appearance of the GUI may vary and may depend on the implementation. An example of the GUI designed to facilitate collaboration is described below.

Figure 3:
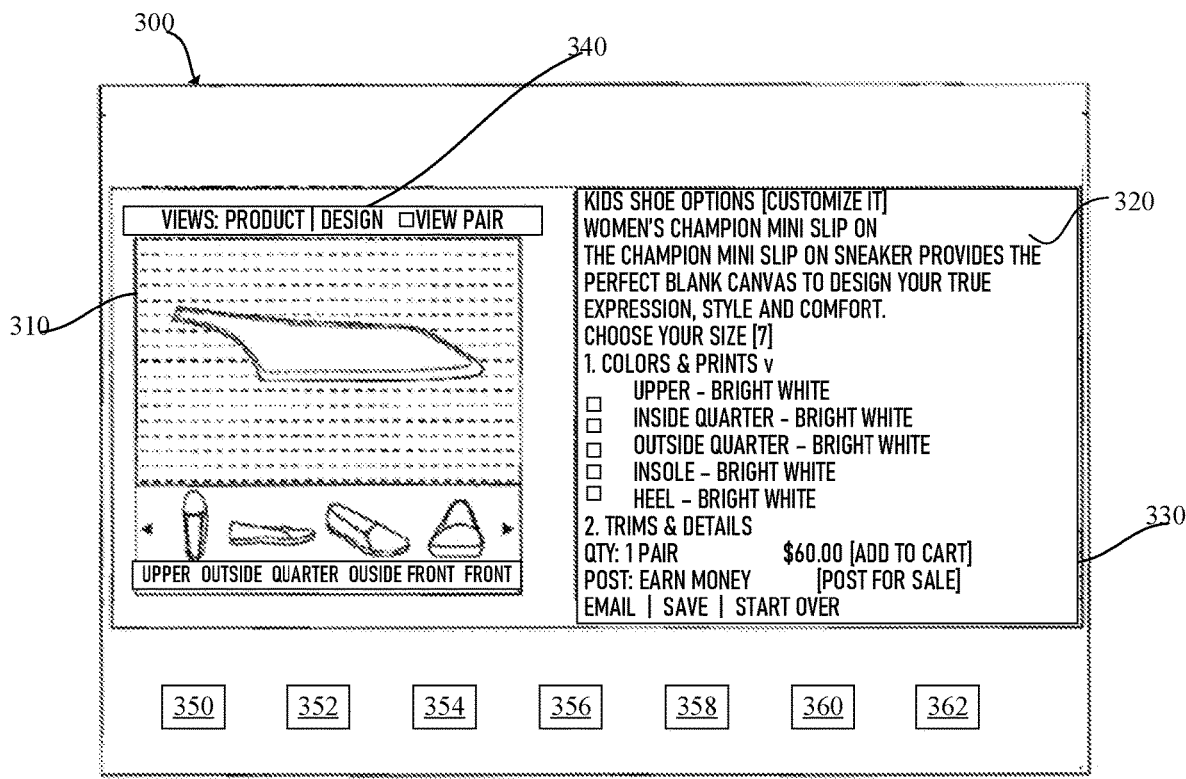
FIG. 3 shows an example graphical user interface configured to enable a role-based collaborative design of custom products based on manufacturing constraints.

FIG. 3 shows an example graphical user interface 300 configured to enable a role-based collaborative design of custom products based on manufacturing constraints. GUI 300 includes a design area 310, a product attribute area 320, a trim and detail area 330, a tab area 340, and one or more functional request selectors 350-362 that are configured to provide support for a role-based collaborative design. In other implementations, GUI 300 may include additional areas, request selectors, sliders, text boxes, and other interactive objects and elements. In other implementations, GUI 300 may show a different arrangement of the interface components than the one shown in FIG. 3.

4.1. Collaboration Request Selectors

One or more functional request selectors 350-362 may be configured to facilitate collaboration between users. The arrangement and appearance of request selectors 350-362 may vary. Some of the request selectors may be implemented as push-buttons, others may be implemented as touch-sensitive objects, touch-screen areas, selectable objects, toggles or switches.

To provide clear examples, request selectors 350-362 shown in FIG. 3 are implemented as selectable objects and include a request selector 350 for requesting a collaboration with a customer support agent or a designer; a request selector 352 for requesting a collaboration with a customer peer; a request selector 354 for requesting a serialized channel to communicate with other users; a request selector 356 for requesting publishing functionalities; a request selector 358 for requesting playback functionalities; a request selector 360 for requesting collaboration on a journaled list; and a request selector 362 for requesting tagging functionalities. Other implementations of GUI 300 may include additional request selectors and additional request selector functionalities.

4.2. Example Components of a GUI

Design area 310 may include one or more regions for displaying one or more two-dimensional (2D) views of an interactive design. Design area 310 may also include one or more 3D views of the interactive design, and/or one or more 2D/3D views of components of the interactive design. The example shown in FIG. 3 depicts design area 310 having a region for showing a part component of an interactive design of a shoe, and a region for showing different views of the shoe.

Product attribute area 320 may include one or more regions for displaying a variety of attributes defined for an interactive design, corresponding selectors for selecting values for the attributes, and different interactive objects for customizing the interactive design.

Trim and detail area 330 may include one or more regions for displaying a variety of options for, for example, ordering a product corresponding to an interactive design shown in design area 310. Trim and detail area 330 may include, for example, a region for displaying interactive buttons for ordering the product, for specifying shipping instructions, and so forth.

Tab area 340 may include one or more interactive tab-objects configured to allow a user to select different sets of the GUI's functionalities. Tab area 340 shown in FIG. 3 shows three tab-objects; however, the count and types of the tab objects is not limited to the ones shown in FIG. 3. A first tab-object may allow a user to select, for example, the functionalities for creating and modifying an interactive design. A second tab-object may allow the user to select the functionalities for displaying views of a product corresponding to the interactive design. A third tab-object may allow the user to search the GUI's functionalities, and a fourth tab-object may allow the user to select a new design or start modification to a default design.

4.3. GUI Functionalities

GUI 300 may provide support for displaying a set of attributes defined for an interactive design and for modifying the values of the attributes. In some embodiments, the attributes and attribute values may be displayed in, for example, product attribute area 320 shown in FIG. 3.

Example of the attributes may include substrate choices (such as a substrate color, a substrate texture, and a substrate size), customization process choices (such as process constraints, process manufacturing information structure), and design area choices (such as design area constraints and a design area mapping).

GUI 300 may provide support for a variety of choices for design interactions. The choices may be filtered by product choices, process and design area constraints, design area choices, and graphics choices. The graphics choices may include images, vectors, shapes (such as a circle, rectangle, polygonal, and curvilinear), lines (such as thickness and color), and fill (such as color and texture). Graphics choices may also include selections based on a cut area, embossing/debossing, and surface characteristics (such as color, reflectivity, refraction, diffraction, transparency and texture).

GUI 300 may provide support for a variety of edit actions that users may perform with respect to interactive objects. The edit actions may include adding a graphics or decorative entity to the design and modifying the graphics or decorative entity in the design. This may include transformations (such as translation, rotation, scaling, shearing, mirroring, deformation, and projection). The edit actions may also include a vector change, a cut area change, an embossed area change and a surface change. In some embodiments, the edit functions may be encoded as a structure data stream.

In some embodiments, an edited interactive design is represented in a form of an active data model and associated edit data. The model may impose constraints on the design, filter edits based on substrate choices, filter edits based on a customization process, and remap edits based on an input design area view.

An active data model may be updated for each shared view available in GUI 300. The updates for a given view may be rendered or filtered based on a device type, a user role, and/or a design view.

In some embodiments, encoded edit data and an active data model may be journaled. The journaling may be performed according to actions pertaining to a specific custom product, actions pertaining to a specific shared session, and actions pertaining to a design of a custom product.

Encoded edit data and an active data model for an interactive design may be shared between users. The sharing may be performed in real time or a pseudo real time. Encoded edit data and an active data model for an interactive design may be used to archive edit state for the design. For example, journaled data and model may provide undo operations, version control of shared design session operations, playback of a shared design session operations, and the like.

4.4. Creating and Modifying Interactive Designs

Example GUI 300 shown in FIG. 3 may be used to support collaborations between users in a process of customizing interactive designs. Customization of an interactive design may include creating the design and modifying the design. To be able to customize the design, the customer may request access to a product description data associated with the interactive design. To be able to collaborate with others, such as peers, customer support agents, graphics designers and others, the customer may request collaboration sessions using, for example, the functionalities of request selectors 350-362, shown in FIG. 3.

To initiate a modification session, a computer collaboration system may generate a user interface for a user. The interface may be generated based on, at least in part, information stored in a user profile. That information may include information indicating user's role. The user interface may include the functionalities that are specific to the user, and that allow the user to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

In some embodiments, the computer collaboration system may cause displaying, in a user interface executing in a user device of the user, an interactive design along with annotations representing attributes, attribute groups and the locations within the design to which the attributes apply. The attributes, default values for the attributes and default ranges for the values for the attributes may be provided by an attribute engine which may be part of the computer collaboration system. The attribute engine may define and/or filter the attributes according to constraints provided by manufacturers, designers or system administrators.

In response to receiving, in the user interface, a rendering of the interactive design with the annotations, a user may select, using the functionalities of the user interface, a specific attribute or a specific attribute group at a specific location within the depiction of the interactive design and select or adjust a value associated with the attribute. For example, the user may select a width-attribute and use a slider object, provided by the user interface, to set a new value for the width parameter. The new value of the parameter may be transmitted as a serialized key-value pair to a product options framework.

Upon receiving a serialized key-value pair, the product options framework may store the serialized key-value pair in a journaled list of modifications for the interactive design.

Upon receiving a request to view the journaled list from the user, the attribute engine may provide the journaled list to the user interface executing on the user device and cause the user interface to display the journal list. At this point, the user may review the modifications included in the journaled list, reorder the modifications included in the list, remove some modifications from the list and/or request applying of the modifications included in the list to the interactive object. The user may also request generating a rendering of the current interactive design. If the rendering of the current interactive design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

5. Collaboration Examples

Collaboration platform 10 may support a variety of collaboration sessions. The collaboration session may be established between two or more users. The types of collaboration sessions may depend on the roles that are assigned to the users who participate in the sessions. For example, a customer may collaborate with a customer support agent, engage in a creative work with a graphic designer, ask an agent or a designer for help in modifying a custom product template, collaborate with the customer's peers, watch a custom product designer create a design in real time, watch a custom product designer demonstrate how to create a design offline, watch a preview of how to create a specific custom product, and/or watch an edited set of journaled actions performed by a graphics artist to learn how to solve a specific design problem.

5.1. Customer-Agent Collaboration

A customer may collaborate with a customer support agent and/or a designer. For example, a customer may request that a customer support agent help the customer to customize an interactive design and show the customer how the agent would modify the interactive design to achieve the design that the customer would like to see.

Examples of collaboration sessions between a customer and a customer support agent and/or a designer may include situations when a customer is exploring a product webpage in a marketplace site and needs help tweaking the design, such as a party invitation, a mug design, and the like. Another example may include a situation when a customer is exploring a product webpage in a marketplace site depicting a picture of a mug and wants to tweak the design. Other example may include a situation when a customer found an interesting design of a wedding invitation, a holiday card, a custom blanket or the like, but does not know how to modify the design. In some other situations, a customer wants to contact a customer service or call a helpdesk and ask for an assistance in using the collaboration tools.

FIG. 2A is a block diagram showing collaboration examples. In FIG. 2A, examples of customer-agent collaboration sessions include a session 252 between a customer 202 and a customer support agent 216, a session 254 between a customer 208 and a customer support agent 210, a session 264 between a customer 214 and a designer 212, a session 266 between customer 208 and designer 212, a session 268 between a customer 214 and a designer 212, a session 270 between a customer 214 and customer support agent 216, and a session 272 between customer 202 and designer 212.

In some embodiment, a customer may use email, text, phone, and any other type of communications to describe to a customer support agent the design that the customer would like to achieve. Once the customer explains to the agent the desired design, the customer may select, from his user interface, a user interface element that would allow setting an editor role to the agent so that the agent could edit the interactive design for the customer. This would include granting the agent access to a product description associated with an interactive design as an editor.

In response to that, the agent may be provided with an updated user interface or a new user interface that would allow the agent to modify the interactive design. For example, the agent could select, from his user interface, a location-based attribute (or a group of attributes) and modify a value associated with the attribute, select another attribute and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive design. Then, a product options framework may render a modified depiction of the interactive design and propagate the rendering to the user devices for rendering in the corresponding user interfaces. An example of collaboration between a customer and a customer support agent (or a designer) is described in detail in FIG. 4.

In some embodiments, a customer who tries to customize an interactive design may seek assistance from a customer support agent or a graphics designer. Suppose that the customer is trying to modify some attributes of the interactive design to achieve a particular appearance of the design; however, he would like to ask a customer support agent for help in modifying the design. The customer is referred to herein as a first user, while the agent is referred to a second user.

Figure 4:
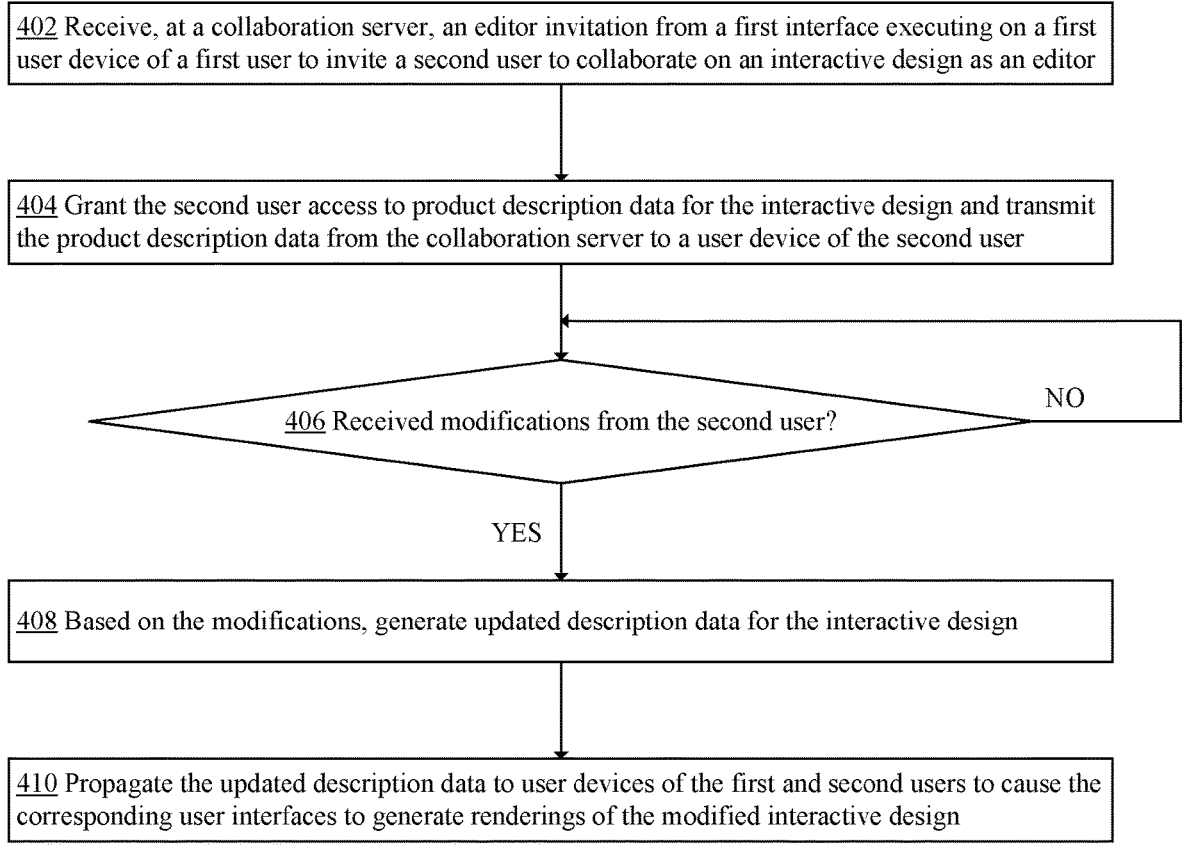
FIG. 4 is a flow diagram showing an example process implementing role-based collaboration between a customer and a customer support agent.

FIG. 4 is a flow diagram showing an example process implementing role-based collaboration between a customer and a customer support agent. FIG. 4 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In step 402, a computer collaboration system receives an editing invitation from a first interface executing on a first user device associated with a first user. The editing invitation may be sent to invite a second user to collaborate on an interactive design as an editor. The invitation may also indicate that the first user wants the computer collaboration system to grant the second user access to data that is specific to the interactive design. The data may be stored as product description data of a product description in, for example, product data definitions 104, shown in FIG. 1.

In step 404, the collaboration system grants the second user access to the product description data for the interactive design and transmits the product description data to a user device of the second user. In some embodiments, the collaboration system may also transmit access key to the second user to allow the second user to access the product description data associated with the interactive design. Furthermore, since the second user is invited to edit the interactive design, the collaboration system may access user profile data 102 to verify a role assigned to the second user, and update user profile data 102 for the second user if needed.

Granting the second user access to the product description data of the interactive design as an editor will allow the second user to not only modify the attributes of the interactive design, but also to save the modifications in a journaled list. For example, if the second user modifies the interactive design, then the modification may be stored in a journaled list associated with the product description of the interactive design.

Typically, a modification is used to modify a single product attribute of the interactive design. However, if the second user modifies several attributes, then each key-value pair may be added to the journaled list. A key-value pairs and associated data may be stored in the journaled list according to a chronological order or any other order defined by the users.

A journaled list may be modified by users who have assigned roles as, for example, customers, customer support agents, or designers. They may remove a modification and remove a corresponding key-value pair and corresponding data associated with the modification from the product description for the interactive design.

In step 406, the collaboration system determines whether any modifications for the interactive design are received from the second user. If the modifications are received from the second user, then the collaboration system performs step 408. Otherwise, the collaboration system performs step 406.

In step 408, the collaboration system parses the modifications received from the second user, and based on the parsed information, generates updated product description data for the product description for the interactive design.

In step 410, the collaboration system propagates the updated product description data to the user interfaces executing on the user devices of the first and second users to cause the user interfaces to generate and display corresponding renderings of the modified interactive design.

5.2. Customer-Peer Collaboration

A customer may collaborate with a customer peer. For example, a customer may request that a peer view an interactive design that the customer is working on, and, for example, provide feedback to the customer. Referring to FIG. 2A, examples of this type of collaboration sessions include a session 256 between customer 202 and a peer 204, a session 260 between customer 202 and a peer 206, and a session 262 between customer 208 and peer 206.

To involve a peer in a collaboration session, a customer may select, from his user interface, a user interface element that would allow setting a viewer role to the peer so that the peer could view the interactive design as the customer modifies the design. This would include granting the peer access to a product description associated with an interactive design as a viewer.

In response to that, the peer may be provided with an updated user interface or a new user interface that would allow the peer to view the interactive design. Once the customer selects, from his user interface, a location-based attribute (or a group of attributes) and modifies a value associated with the attribute, and so forth, each modification would be reflected in a user interface displayed for the peer. Each modification performed by the customer may be saved as a serialized key-value pair, and the pairs may be transmitted to a product options framework, which may update the product description for the interactive design. Then, the product options framework may render a modified depiction of the interactive design and propagate the rendering to the user devices for rendering in the corresponding user interfaces.

Once the peer has a chance to view, in the peer's user interface, the rendering of the interactive design, the peer may provide his feedback and comments to the customer. The peer may provide his feedback/comments to the customer via email, text, phone, or the like. An example of collaboration between a customer and a peer is described in detail in FIG. 5.

In some embodiments, a customer may seek feedback from his peers on an interactive design. Suppose that the customer is trying to modify some attributes of the interactive design to achieve a particular appearance of the design, and the customer would like to ask his peer for his opinion on the customization. The customer is referred to herein as a first user, while the peer is referred to a second user.

Figure 5:
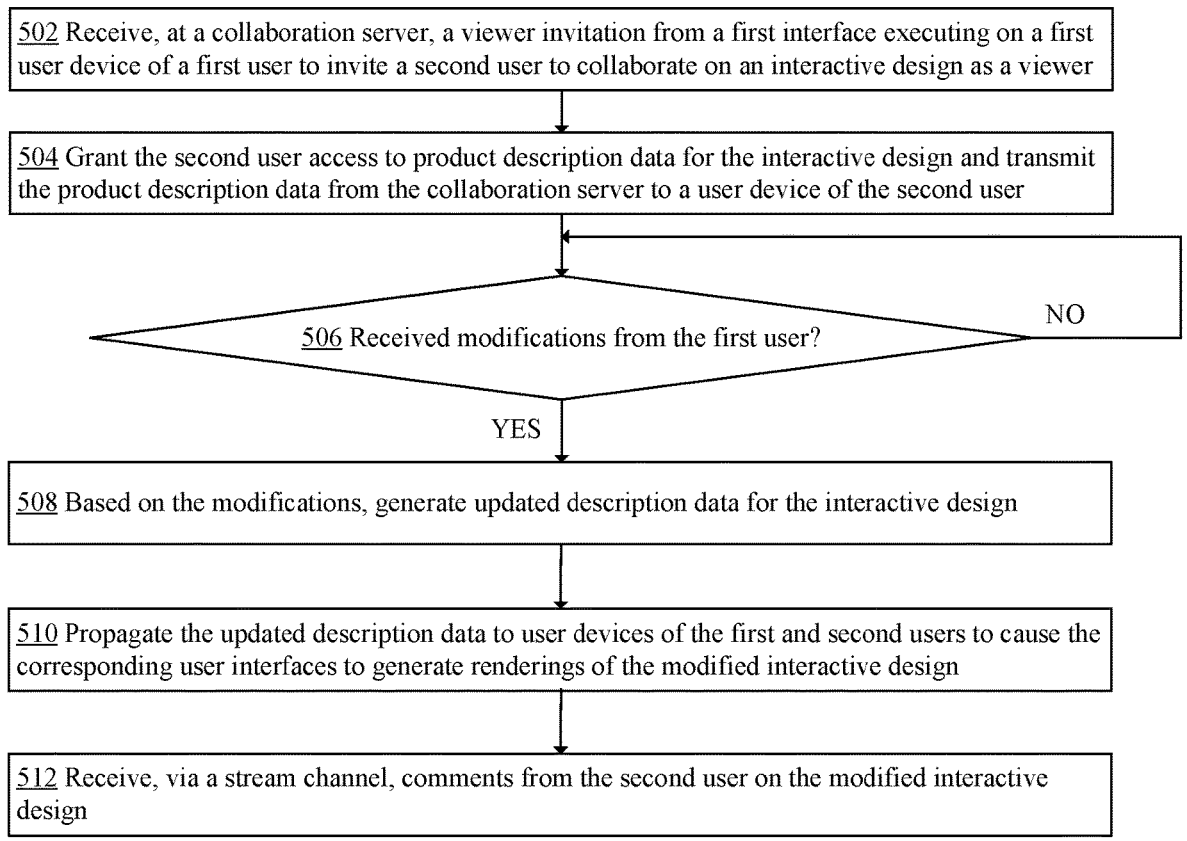
FIG. 5 is a flow diagram showing an example process implementing role-based collaboration between a customer and a customer peer.

FIG. 5 is a flow diagram showing an example process implementing role-based collaboration between a customer and a customer peer. In step 502, a computer collaboration system receives a viewer invitation from a first interface executing on a first user device associated with a first user. A viewer invitation may be sent to invite a second user to collaborate on an interactive design as a viewer. The invitation may also indicate that the first user wants the computer collaboration system to grant the second user access to product description data for the interactive design.

In step 504, the collaboration system grants the second user access to the product description data for the interactive design and transmits the product description data to a user device of the second user. In some embodiments, the collaboration system may also transmit access key to the second user to allow the second user to access the product description data associated with the interactive design.

In step 506, the collaboration system determines whether any modifications for the interactive design are received from the first user. If the modifications are received from the second user, then the collaboration system performs step 508. Otherwise, the collaboration system performs step 506.

In step 508, the collaboration system parses the modifications received from the first user, and based on the parsed information, generates an updated product description for the product description for the interactive design. In this step, the collaboration system also generates updated product description data for the product description for the interactive design.

In step 510, the collaboration system propagates the updated product description data to the user interfaces executing on the user devices of the first and second users to cause the user interfaces to generate and display renderings of the modified interactive design.

In step 512, the collaboration system receives comments from the second user on the modified interactive design and passes the comments to the first user. The comments may be received via, for example, a separate channel, such as a stream channel, described above. The comments may include an approval of the design and/or suggestions for improving the design.

The collaboration system may also receive, via the stream channel, comments from the first user, and may communicate those comments to the second user. The users may continue communicating with each other as the first user modifies the interactive design.

5.3. Education and Management Collaboration

Designers, artists and customer service agents may prepare, and broadcast tutorials and lectures related to product customization and tools configured to customize the products. For example, a designer may announce a tutorial collaboration session to a group of users and allow the users to join his collaboration session at a given day and at a given time.

Managers of marketplace websites and developers of product customization sites may monitor collaboration sessions established between users who access the sites. For example, a site manager may want to monitor the quality of customer support team by tapping to the collaboration sessions that the customer support teams use to provide support to customers.

Managers and developers of marketplace websites may communicate with each other via collaboration sessions to discuss improvements to their sites, customer services, and product handling alternatives.

Social media coordinator may contact managers and developers of marketplace websites via collaboration sessions to seek advice on designing products such as event flyers, event invitations, promotional materials, brand paraphernalia and insignia, and other products. The coordinators may also provide, via the collaboration sessions, feedback on the marketplace websites, the customer services, and potential improvements.

5.4. Collaboration Using Serialized Streams

Two or more users may communicate and collaborate with each other using serialized streams such as side channels. The serialized streams may be configured to support multi-party communications such as text messaging, voice communications, and video communications. Referring to FIG. 2A, examples of this type of collaboration sessions include a session 258 between peer 204 and peer 206, and a session 274 between designer 212 and customer support agent 210.

For example, a customer may design an initial version of an interactive design and, using the approach described above, invite his peer to view the design. Using an additional communications side channel, the peer may provide comments on the design, suggest changes to the design, or ask questions about the design. The customer may use the same side channel to provide comments, questions and/or suggestions to the peer. The customer and the peer may communicate with each other via the side channel by exchanging text messages, voice messages and/or video communications.

5.5. Publishing

A user may publish his own interactive design to a collaboration team. For example, using the functionalities of a user interface, a user may select a user interface element that is configured to publish a collaboration invitation to his collaboration team. The invitation may be encoded with a key that allows the users of the collaboration team to view a sequence of edits that the user has been making to his own interactive design. The collaboration team may passively watch the design process in real time and may comment on the design using, for example, an additional communications channel, described above.

In broad terms, publishing may include publishing a list of editing instructions so that the instructions may be viewed by other users and publishing a list of editing instructions so that other users may, in turn, perform editing actions on the list of editing instructions. For example, the users may change, in the list of instructions, some key-value pairs or groups that are tagged for easy replacement.

5.6. Playback Collaboration

A user may use a collaboration platform to journal modifications made to an interactive design and to playback the journaled modifications. For example, a user may select, from a user interface, a user interface element that is configured to mark a start point in a journaled list. As the user performs a series of edits on the interactive design, the modifications, including key-value pairs, are transmitted to a product options framework which stores the key-value pairs in the journaled list. When the user finishes modifying the interactive product, the user may select another user interface element that instructs the product options framework to mark an end point in the journaled list. Then, the user may select a user interface item to playback the journaled instructions from the start point to the end point to view the series of modifications performed by the user on the interactive design.

5.7. Journaled List Collaboration

A user may collaborate with other users to modify a journaled list. For example, a user may select a set of user interface elements that are configured to transmit key-value pairs from the user interface to a product options framework as the user modifies an interactive design. Upon receiving the pairs, the product options framework may store the pairs in a journaled list and allow the user and his peers to perform editing or transformation operations on the list.

The types of editing or transformation operations that may be performed on the journaled list may include modifying values within a specific key-value pair stored in the list and modifying a single product attribute in a product description associated with the interactive design. The operations may also include removing a specific key-value pair from the list; removing all key-value pairs and associated data that do not directly contribute to a final form of the interactive design; re-ordering the key-value pairs and associated data, so that a final form of the interactive design is preserved, and edits that apply to a specific attribute group are performed in-sequence; and extending an editing operation and re-ordering operations, then grouping certain key-value pairs related to specific attribute groups, design areas, or location-based attributes, so that they may be edited as a single group. The operations may also include extending the editing operation listed above, so that key-value pair groups may be stored in memory for use later.

5.8. Tagging

A user may collaborate with other users in creating and using tags. For example, a user may tag key-value pairs that apply an image, a vector graphic, a 3D model or other media to an interactive design so that the tagged object may be easily replaced in future edits. The operations may also include tagging key-value pairs that apply the text, color, surface qualities or other attribute groups, so that the attributes may be easily replaced in future edits. This may allow customizing an interactive design using a couple of clicks, not navigating through countless clicks as required by conventional platforms to complete the customization.

Tagging may also include associating text, voice and/or video annotation with a specific key-value pair or key-value group in a journaled list. Tagging may also include uploading, converting, parsing and/or transforming editing operations from another compatible source and applying the editing operations to a product description associated with the interactive design.

6. Manufacture of Custom Digital Products

Suppose that a custom digital product is a customized greeting card. Furthermore, suppose that in the course of one or more collaboration sessions, collaborators developed an interactive, digital design of the customized greeting card. The processes described above may be employed to digital print the customized greeting card.

In some embodiments, various means are provided for handling manufacturing of custom products provided in a digital form. In this context, a digital product is a product that may be fully realized in software and digital media. Such products may have functionalities that are similar to functionalities of physical products. For example, it is possible to manufacture a physical custom greeting card using the methods described herein, and it is also possible to produce a digital greeting card by using very similar means. Instead of publishing a greeting card using a printing process, a digital greeting card may be manufactured by publishing it in a digital form which may be viewed by a specific digital service.

Constraints for generating digital and physical greeting cards may be similar. The constraints may be managed by a product options framework, described above. Furthermore, generating digital and physical greeting cards may have the resolution constraints. That means that for an optimal quality of the visual presentation of the cards, each card generating process may have a constraint in the number of pixels-per-inch that is required.

Furthermore, generating digital and physical greeting cards may have the size and ratio aspect constraints. Based on the paper size in the physical case, and on screen size in the digital case, there are constraints on the formatting and placement of design elements for the greeting card.

Moreover, both have color constraints. Each may have a target ICC color profile that imposes a specific gamut of colors for manufacturing the product. In the case of the physical product, it may be a CMYK profile such as U.S. Web Coated (SWOP) v2. In the case of the digital version, it may be sRGB IEC61966-2.1. Publishing each product requires rendering each design element to fit the constraints.

Furthermore, both are published using manufacturing instructions that meet specific digital standards. Each must be expressed as a specific set of manufacturing instructions that meet the constraints. Finally, the customization and collaboration of each are usually the same.

In some embodiments, supporting digital products may include, but is not limited to, greeting cards, invitations, business insignias (such as logos, email and social media tags), birth announcements, personal identities, corporate communications, and virtual products, and as a token or representation of a physical product.

7. Digital Products as Tokens of Physical Products

A custom digital product may be used as a token for one or many custom physical products. This product type may be called a DigitalProductToken. The global-key-values journaled for this type of product may be used to support the DigitalProductToken. The global-key-values journaled for the product are referred to as a KeyValueJournal.

In some embodiments, a manufacturing system is built to accept a KeyValueJournal from a design session used to create an interactive design. The manufacturing system may also be configured to accept additional key-values that can be used to modify the output generated by the system.

One use case is for a designer, who has completed a collaboration that may be applied to a physical product, or to a set of physical products, to use the captured KeyValueJournal to create a presentation or demonstration of the created design. As any user might participate in creating a custom product, the designer may browse the different forms of presentations that may be constructed from the KeyValueJournal of the design. The designer may select the digital product and select one of their KeyValueJournal session to apply to the product.

As in any other custom product, the product options framework may generate an interface and present the customized product in the interface. The framework may also generate an interface for other key-values pairs that may apply to the intended custom digital presentation.

For example, the product options framework may build an interface for a key called OutputStyle. The interface for the OutputStyle key may allow the designer to select values for the media for the presentation should take. The choices may include a JPEG_Image, GIFF_Image or H264_Video. If the designer chooses the GIFF_Image option, then the product options framework will send the instructions to the manufacturing system to perform the following actions: traverse each of the key-values in the KeyValueJournal, and for each one, use the User Product Renderer to render the state of the custom physical product with that modification as images in the sRGB 32-bit RGBA format.

The following instructions may include: store each of the renderings in a local image cache; traverse the images in the local image cache and determine an optimal color palette for that collection of images; convert the images in the local image cache from 32-bit RGBA format to 8 bit Indexed color; embed a digital watermark which encodes the input KeyValueJournal's UUID in the 8 bit indexed color image cache; begin Encoding the Gif file; write the Header bytes; write the Logical Screen Descriptor bytes; write the found color palette as a gif Global Color Table; write the gif 8 bit character application name, for example, 'ZazzleCo'; embed metadata as a comment which encodes the input KeyValueJournal's UUID; and set the FrameCount to 1.

If there is an image in the 8 bit indexed color image cache continue to the step for storing the image. Otherwise, write the gif Graphic Control Description for the FrameCount; process the first 8 bit indexed color image cache into blocks of 255 LZW compressed bytes; write the compressed bytes; remove the first image from the 8 bit indexed color image cache; increment the FrameCount; write the file terminator; and output the manufactured Gif Product.

In some embodiments, a larger set of modifying key-values directs the DigitalProductToken manufacturing system to output many different styles of DigitalProductTokens. Each style of digital product may contain the embedded KeyValueJournal's UUID as metadata, and a digital watermark.

8. Digital Product as Tokens to Obtain Physical Products

In the example described above, a designer was using the capabilities of the collaboration platform to produce a custom digital presentation of a custom physical product. The presentation in a form of DigitalProductToken may be used to demonstrate to a consumer the use of a user interface to customize the physical product(s) and provide a means to choose and purchase a custom physical product.

An example of a use case for this form of DigitalProductToken may include producing, by a manufacturing system, a custom digital presentation and providing the custom digital presentation to a designer who can view the custom digital presentation and review it.

If a designer decides to modify the custom digital presentation, then a product options framework is invoked to generate and display a user interface configured to modify the custom digital presentation from its product description and to present it to the designer.

If the designer decides to change a color choice attribute using the functionalities of the user interface, then the key-values for the product description of the custom digital presentation are updated and stored.

If the designer decides to submit the digital product for manufacture, then the product description and the key-values are sent to a manufacturing entity.

Later, the designer may receive a modified custom digital presentation and may review it in the user interface.

If the designer accepts the custom digital presentation, the transaction of the custom digital presentation is completed and stored in a storage device. Furthermore, a secure URI is created and sent to the designer to indicate to the designer the location where the embedded presentation is stored in the web site of their choice.

If a consumer views the custom digital presentation and selects it, then the selection causes the consumer's browser to link to the custom digital presentation service to inquire about the physical product. Then, the service recovers the KeyValueJournal's UUID that represents a full description of the custom physical product.

In some embodiments, the product option framework builds a user interface for the consumer for the referenced custom physical product which allows the consumer to modify constrained attributes of the custom product. Then, the updated version of the custom physical product rendered by a user product renderer may be displayed in the user interface.

Suppose that, after inspecting the displayed product, the consumer decides to purchase the custom physical product, and indicates his intend to purchase by selecting a particular button or an icon displayed on the interface.

In the response to the selection, the system may determine the forms of ownership and license that are recorded for the KeyValueJournal that was used to create the custom product.

Based on the KeyValueJournal, the system determines how and in what form the designer is to be compensated for their ownership of the design recorded in the KeyValueJournal.

Then, the manufacturing method associated with the physical product is used to manufacture the product based on the instructions supplied by the product attribute information stored in the key-value store. Once the physical product is manufactured, the physical product is shipped to the customer. This concludes the process of using the KeyValueJournal associated with the interactive design as a token to obtain the corresponding physical product

9. Improvements Provided by Certain Embodiments

In some embodiments, a system and a computer-implemented method allow role-based and attribution tracking collaborative design of custom products based on manufacturing constraints. The system and method enable collaboration between many users, applications and websites and allow, for example, customers and designers to share their work, contributions, licenses, and knowledge on product-customization tasks. The approach allows the customers to access, for example, many applications and websites to engage specialists and experts to provide help with specific tasks and designs.

In some embodiments, a system and a computer-implemented method allow overcoming the difficulties in navigating through countless sets of attributes and choices that are difficult to understand using conventional product-customization platforms. The method and the system provide a solution to a problem of navigating through a myriad of attributes to achieve the desired customization of the product efficiently and effectively.

A computer collaboration system may be configured to coordinate interactions between users according to the roles assigned to the users. Information about the roles assigned to the users may be used to generate improved user interfaces that are specific to the users and the users' roles.

10. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
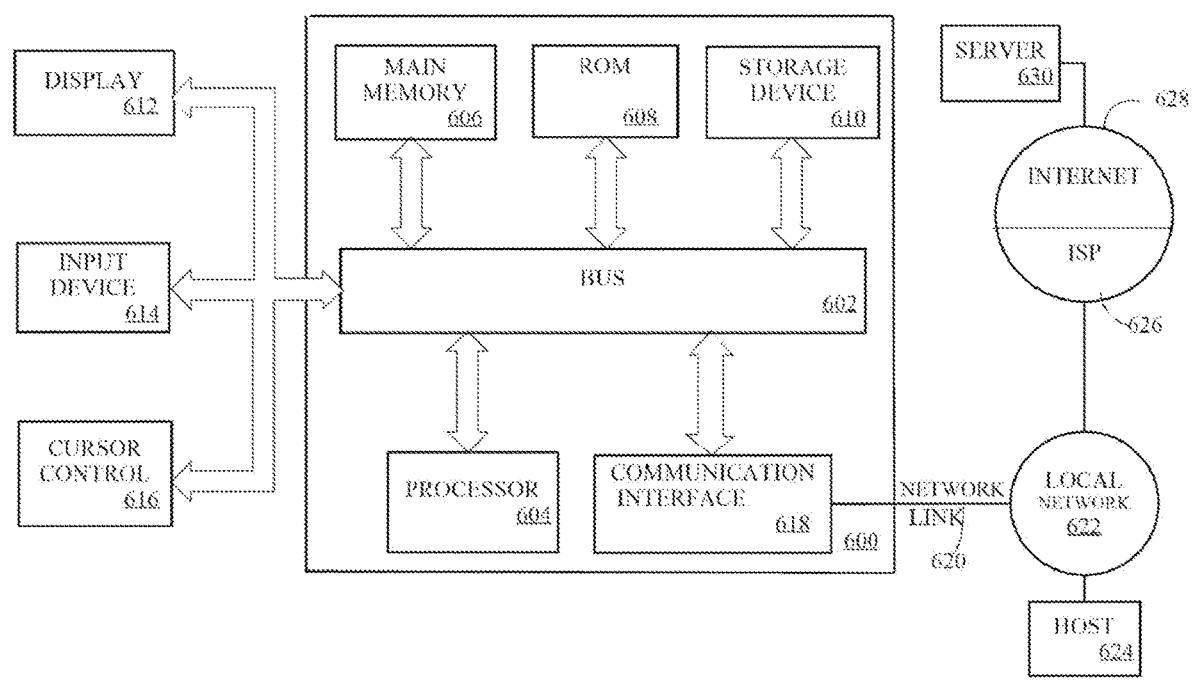
FIG. 6 is a block diagram of a computer system on which embodiments of the approach may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated service digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for collaborative customization of physical product and for tracking collaboration attribution during the collaborative customization, the method comprising:

receiving, by a collaboration computer, having a computer processor and memory, and over a computer network, product description data for an interactive design;

wherein the product description data for the interactive design comprises data for generating a graphical visual representation of a physical product that is capable of custom manufacture with a plurality of variable product attributes associated with the interactive design;

parsing, by the collaboration computer, the product description data to identify a plurality of global-key-values pairs journaled within the product description data and associated with a plurality of contributors;

generating a token represented as a universally unique identifier that references a physically or logically separate location where the plurality of global-key-values pairs is stored;

embedding the token into the product description data as a watermark;

based on, at least in part, the plurality of global-key-values pairs, constructing, by the collaboration computer, an ownership-attribution tree;

determining whether a request for a physical product corresponding to the interactive design has been made;

in response to receiving the request for the physical product corresponding to the interactive design, transmitting the product description data, comprising the token, and the ownership-attribution tree to a manufacturing entity to cause the manufacturing entity to:

based on, at least in part, the ownership-attribution tree, the token, and the plurality of key-values pairs:

extract the token from the product description data;

use the location at which the plurality of global-key-values pairs is stored and which is saved in the token to retrieve the plurality of global-key-values pairs from the location; and generate, based on the retrieved plurality of global-key-values pairs, manufacturing instructions for customizing the physical product;

transform the manufacturing instructions to a specific set of manufacturing instructions that meet specific digital standards determined based on manufacturing constraints;

store the specific set of manufacturing instructions, which are in the specific digital standard and that represents the ownership-attribution tree, in association with the request;

based on the specific set of manufacturing instructions, automatically generate publishing manufacturing instructions;

transmit the publishing manufacturing instructions to a product customization server in real time to cause the product customization server to proceed with generating the physical product corresponding to the interactive design.

2. The method of claim 1, wherein the plurality of global-key-values pairs, includes one or more of:

an age restriction key-value that includes an age restriction key and an age value;

a content lock key-value that includes a content lock key and a content lock key value;

a blacklist key-value that includes a blacklist key and a blacklist;

a whitelist key-value that includes a whitelist key and a whitelist;

an ownership key-value that includes an ownership key and a user universally unique identifier (user ID);

a copyright key-value that includes a copyright key and a user ID;

a license key-value that includes a license key and a universally unique identifier for a specific license agreement held between an owner or a primary designer and a computer collaboration server;

a customer support key-value that includes a support key and a support agent contract identifier; or an attribution key-value that includes an attribution key and a universally unique identifier that references a set of software instructions for manufacturing to apply a marking on a product, as may be directed by copyright or licensing agreements.

3. The method of claim 1, wherein product description data for the interactive design is generated as one or more modifications to the interactive design are received from one or more user interfaces and are used to update the interactive design.

4. The method of claim 1, wherein the plurality of global-key-values pairs journaled within the product description data is initiated when a customization session for customizing the interactive design is initiated.

5. The method of claim 4, wherein the plurality of global-key-values pairs journaled within the product description data is updated each time when a contributor, granted a valid license and participating in the customization session, provides modifications to the interactive design.

6. The method of claim 5, wherein the plurality of global-key-values pairs journaled within the product description data carries license agreement information and restriction information specific to the customization session and the interactive design.

7. The method of claim 6, wherein, upon detecting that no further modifications for the interactive design are provided, the plurality of global-key-values pairs journaled within the product description data is stored in a global-key-values database.

8. The method of claim 6, further comprising:
tagging each of the plurality of global-key-values pairs and associated data stored in the product description data according to one or more of: an image type, a vector graphics, a 3D model, or other attribute;
extending editing operations to allow editing objects according to a tag.

9. The method of claim 7, further comprising:
tagging each of the plurality of global-key-values pairs and associated data stored in the product description data according to one or more of: a text, a color, a surface quality, or a group attribute;
extending editing operations to allow editing objects according to a tag.

10. The method of claim 1, wherein the plurality of global-key-values pairs are used to perform one or more of: attribution-tracking, tracking ownership within a customization session, tracking licensing agreements of collaborators participating in the customization session, tracking copyrights and access privileges with respect to assets used and modified during the session, or tracking attributions of collaborators participating in the session.

11. One or more non-transitory computer readable storage media storing one or more instructions which, when executed by one or more processors, cause the one or more processors to perform:
receiving, by a collaboration computer, having a computer processor and memory, and over a computer network, product description data for an interactive design;
wherein the product description data for the interactive design comprises data for generating a graphical visual representation of a physical product that is capable of custom manufacture with a plurality of variable product attributes associated with the interactive design;
parsing, by the collaboration computer, the product description data to identify a plurality of global-key-values pairs journaled within the product description data and associated with a plurality of contributors;
generating a token represented as a universally unique identifier that references a physically or logically separate location where the plurality of global-key-values pairs is stored;
embedding the token into the product description data as a watermark;
based on, at least in part, the plurality of global-key-values pairs, constructing, by the collaboration computer, an ownership-attribution tree;
determining whether a request for a physical product corresponding to the interactive design has been made;
in response to receiving the request for the physical product corresponding to the interactive design, transmitting the product description data, comprising the token, and the ownership-attribution tree to a manufacturing entity to cause the manufacturing entity to:
based on, at least in part, the ownership-attribution tree, the token, and the plurality of key-values pairs:
extract the token from the product description data;
use the location at which the plurality of global-key-values pairs is stored and which is saved in the token to retrieve the plurality of global-key-values pairs from the location; and
generate, based on the retrieved plurality of global-key-values pairs, manufacturing instructions for customizing the physical product;
transform the manufacturing instructions to a specific set of manufacturing instructions that meet specific digital standards determined based on manufacturing constraints;
store the specific set of manufacturing instructions, which are in the specific digital standard and that represents the ownership-attribution tree, in association with the request;
based on the specific set of manufacturing instructions, automatically generate publishing manufacturing instructions;
transmit the publishing manufacturing instructions to a product customization server in real time to cause the product customization server to proceed with generating the physical product corresponding to the interactive design.

12. The one or more non-transitory computer readable storage media of claim 11, wherein the plurality of global-key-values pairs, includes one or more of:
an age restriction key-value that includes an age restriction key and an age value;
a content lock key-value that includes a content lock key and a content lock key value;
a blacklist key-value that includes a blacklist key and a blacklist;
a whitelist key-value that includes a whitelist key and a whitelist;
an ownership key-value that includes an ownership key and a user universally unique identifier (user ID);
a copyright key-value that includes a copyright key and a user ID;
a license key-value that includes a license key and a universally unique identifier for a specific license agreement held between an owner or a primary designer and a computer collaboration server;
a customer support key-value that includes a support key and a support agent contract identifier; or
an attribution key-value that includes an attribution key and a universally unique identifier that references a set of software instructions for manufacturing to apply a marking on a product as may be directed by copyright or licensing agreements.

13. The one or more non-transitory computer readable storage media of claim 11, wherein product description data for the interactive design is generated as one or more modifications to the interactive design are received from one or more user interfaces and are used to update the interactive design.

14. The one or more non-transitory computer readable storage media of claim 11, wherein the plurality of global-key-values pairs journaled within the product description data is initiated when a customization session for customizing the interactive design is initiated.

15. The one or more non-transitory computer readable storage media of claim 14, wherein the plurality of global-key-values pairs journaled within the product description data is updated each time when a contributor, granted a valid license and participating in the customization session, provides modifications to the interactive design.

16. The one or more non-transitory computer readable storage media of claim 15, wherein the plurality of global-key-values pairs journaled within the product description data carries license agreement information and restriction information specific to the customization session and the interactive design.

17. The one or more non-transitory computer readable storage media of claim 16, wherein, upon detecting that no further modifications for the interactive design are provided, the plurality of global-key-values pairs journaled within the product description data is stored in a global-key-values database.

18. The one or more non-transitory computer readable storage media of claim 16, storing additional instructions for:
 tagging each of the plurality of global-key-values pairs and associated data stored in the product description data according to one or more of: an image type, a vector graphics, a 3D model, or other attribute;
 extending editing operations to allow editing objects according to a tag.

19. The one or more non-transitory computer readable storage media of claim 17, storing additional instructions for:
 tagging each of the plurality of global-key-values pairs and associated data stored in the product description data according to one or more of: a text, a color, a surface quality, or a group attribute;
 extending editing operations to allow editing objects according to a tag.

20. The one or more non-transitory computer readable storage media of claim 11, wherein the plurality of global-key-values pairs are used to perform one or more of: attribution-tracking, tracking ownership within a customization session, tracking licensing agreements of collaborators participating in the customization session, tracking copyrights and access privileges with respect to assets used and modified during the session, or tracking attributions of collaborators participating in the session.

* * * * *